United States Patent
Tilz

(10) Patent No.: US 10,150,682 B2
(45) Date of Patent: Dec. 11, 2018

(54) FILTER SYSTEM FOR REMOVING AND/OR NEUTRALIZING UNDISSOLVED OILS, GREASES, AND SALTS AND/OR METAL ABRASION DEBRIS ON AND IN EMULSIONS CONTAINING WATER

(71) Applicant: NEWFLUID GmbH, Mannheim (DE)

(72) Inventor: Wolfgang Tilz, Schwetzingen (DE)

(73) Assignee: NEWFLUID GMBH, Mannheim (DE)

( * ) Notice: Subject to any disclaimer, the term of this patent is extended or adjusted under 35 U.S.C. 154(b) by 201 days.

(21) Appl. No.: 14/896,699

(22) PCT Filed: Jun. 13, 2014

(86) PCT No.: PCT/EP2014/062320
§ 371 (c)(1),
(2) Date: Dec. 8, 2015

(87) PCT Pub. No.: WO2014/198867
PCT Pub. Date: Dec. 18, 2014

(65) Prior Publication Data
US 2016/0101993 A1    Apr. 14, 2016

(30) Foreign Application Priority Data

Jun. 13, 2013   (DE) .................. 10 2013 211 032

(51) Int. Cl.
*C02F 1/40* (2006.01)
*B01D 17/00* (2006.01)
(Continued)

(52) U.S. Cl.
CPC ............ *C02F 1/40* (2013.01); *B01D 17/0202* (2013.01); *B01D 17/0205* (2013.01);
(Continued)

(58) Field of Classification Search
CPC .............. B01D 17/045; B01D 17/0101; B01D 17/0205; B01D 17/041; B01D 24/007;
(Continued)

(56) References Cited

U.S. PATENT DOCUMENTS 4,295,966 A * 10/1981 LeBlanc ............... B01D 35/185
196/46.1
5,207,895 A    5/1993 Basseen et al.
(Continued)

FOREIGN PATENT DOCUMENTS

DE    4211123 A1    10/1993
DE    4404010 C1    12/1994
(Continued)

OTHER PUBLICATIONS

Tilz, DE102007049845, English Machine Translation, pp. 1-3 (Year: 2009).*
(Continued)

*Primary Examiner* — Claire A Norris
(74) *Attorney, Agent, or Firm* — Stephen T. Olson; Harness, Dickey & Pierce, P.L.C.

(57) ABSTRACT

A filter system for removing and/or neutralizing undissolved oils, greases, and salts on/in water-containing emulsions from, in particular, tanks and baths that are used to hold and store emulsions, which are used to cool and lubricate workpieces and tools during machining, comprising at least one emulsifier filter, a downstream suction/pressure pump, a unit for gas enrichment, an adhesion filter having an automatic deaerator, a downstream oil-collecting vessel, and a capillary filter, wherein these are combined as a unit, such that the oil/grease film and the emulsion can be mechanically, chemically, and biologically treated.

19 Claims, 10 Drawing Sheets

(51) Int. Cl.
  *B01D 24/00* (2006.01)
  *C02F 1/00* (2006.01)
  *C02F 3/28* (2006.01)
  *C02F 9/00* (2006.01)
  *B01D 17/02* (2006.01)
  *B01D 17/04* (2006.01)
  *C02F 3/10* (2006.01)
  *C02F 101/32* (2006.01)

(52) U.S. Cl.
  CPC ......... *B01D 17/041* (2013.01); *B01D 24/007* (2013.01); *C02F 1/004* (2013.01); *C02F 3/2826* (2013.01); *C02F 9/00* (2013.01); *C02F 3/108* (2013.01); *C02F 3/109* (2013.01); *C02F 2101/325* (2013.01); *C02F 2209/05* (2013.01); *C02F 2209/22* (2013.01); *Y02W 10/15* (2015.05)

(58) Field of Classification Search
  CPC ............ B01D 17/0214; B01D 21/0012; B01D 21/0039; C02F 1/004; C02F 3/2826; C02F 9/00; C02F 1/40
  USPC .......... 210/DIG. 5, 540, 615, 258, 708, 799, 210/304, 693, 776, 788
  See application file for complete search history.

(56) References Cited

U.S. PATENT DOCUMENTS

| | | | |
|---|---|---|---|
| 5,599,457 | A | 2/1997 | Fanning et al. |
| 5,601,705 | A * | 2/1997 | Glasgow ................ B01D 17/00 210/104 |
| 6,413,430 | B1 | 7/2002 | Berger |
| 7,368,054 | B2 | 5/2008 | Porter et al. |

FOREIGN PATENT DOCUMENTS

| | | |
|---|---|---|
| DE | 19515710 A1 | 11/1995 |
| DE | 19718215 A1 | 11/1998 |
| DE | 20013780 U1 | 1/2001 |
| DE | 10237938 B4 | 3/2004 |
| DE | 102007049845 A1 | 4/2009 |
| DE | 102009043110 A1 | 3/2011 |
| DE | 102010028116 A1 | 10/2011 |
| EP | 1747810 A1 | 1/2007 |
| WO | WO-99/29390 A1 | 6/1999 |

OTHER PUBLICATIONS

Tilz, DE102009043110, English machine Translation, pp. 1-2 (Year: 2011).*
International Search Report (10 pages) for PCT/EP2014/062320, ISA/EP, dated Mar. 3, 2015.
Written Opinion of the ISA (11 pages) for PCT/EP2014/062320, ISA/EP, dated Mar. 3, 2015.
German Search Report for DE 102013211032.4, dated Dec. 2, 2013 (2 pages).
International Preliminary Report on Patentability and Written Opinion of the International Searching Authority for PCT/EP2014/062320, dated Dec. 23, 2015.
"ASTM D570-98: Standard Test Method for Water Absorption of Plastics." ASTM International; 1998. West Conshohocken, PA (4 pages).
"Chemical Properties." Physicality Iupilon/NOVAREX. Mitsubishi Engineering Plastics Corporation; 2010 (10 pages).

* cited by examiner

FILTER SYSTEM FOR REMOVING AND/OR NEUTRALIZING UNDISSOLVED OILS, GREASES, AND SALTS AND/OR METAL ABRASION DEBRIS ON AND IN EMULSIONS CONTAINING WATER

CROSS-REFERENCE TO RELATED APPLICATIONS

This application is a 371 U.S. National Stage of International Application No. PCT/EP2014/062320, filed Jun. 13, 2014, which claims the benefit of and priority to German Patent Application No. 1020132110324, filed Jun. 13, 2013. The disclosures of the above applications are incorporated herein by reference.

A filter system for removing and/or neutralizing undissolved oils, greases and salts, preferably also suspended particulate matter, such as metal abrasion debris in and on emulsions containing water.

The invention relates to a filter system for removing and/or neutralizing undissolved oils, greases and salts, preferably also suspended particulate matter, such as metal abrasion debris in/on emulsions containing water from tanks and baths in particular, which are used for holding and storing emulsions.

Filter systems for removing undissolved oils and greases from emulsions containing water from tanks and baths in particular, which are used for holding and storing emulsions, are known in a variety of embodiments. Surface belt skimmers that remove the floating oil/grease film are generally used for emulsion tanks and baths, wherein a mechanically/electrically driven continuous belt is immersed in the tank or bath, so that the oil/grease adhering to the continuous belt is filtered out of the emulsion from the surface as a result of the upward movement. The oil/grease adheres to the continuous belt, which is then deflected from an upward movement to a downward movement by means of a guide pulley and then is freed of the oil/grease film by means of a stripper. The oil/grease is collected in a container (for example, a bucket) by means of a horizontally descending chute. The continuous belt that has been cleaned in this way is then immersed again in the tank or bath, so that the adhering oil/grease is again filtered off of the surface of the emulsion by means of a second guide pulley due to the up-and-down movement of the continuous belt.

In practice, there are various known machines for machining workpieces. These machines use emulsions to cool and lubricate the workpieces and the tool. Various lubricants and greases are used in computer-controlled lathing and milling machines to reduce friction and to improve the sliding ability of the moving tool and workpiece containers, for example. Such lubricants and greases prevent an increased application of force in the movement and thereby prevent seizing and thus prevent a machine defect.

Such lubricants are known in practice. They are known as so-called bed track oils or bedways oils, which usually consist of paraffin and naphthene basic hydrocarbons with additives (e.g., brand name: CGLP ISO-VG bedways oils (68) and (220) from the manufacturing company Scharr). These lubricants are dosed between the sliding rails of the tool and workpiece holders continuously during operation and thereby form a thin film and thus ensure good stick-slip properties. However, the bedways oil is forced onto the edges of the sliding rails due to the movement of the sliding rails and must therefore be redosed. The emulsion is conveyed out of the tank or bath by means of a suction-pressure pump for cooling and lubricating when machining the workpieces using tools, and is sprayed through nozzles onto the location to be machined. The cooling and lubricating liquid, an emulsion comprised of a mixture of mineral oil, emulsifiers, stabilizers and inhibitors, for example (manufactured by Blaser, for example, brand name: BLASOCUT® BC 25 MD) is mixed with 90-98% water and 2-10% Blaser mineral oil mixture. When the emulsion runs down from the workpiece and the tool, the bedways oil is rinsed from the edges of the sliding rail and is collected in the machine pan or the tank, where it collects as an oil/grease film on the surface of the emulsion. In addition, numerous metal chips formed during machining by lathing, milling or drilling, etc. of the workpiece, are flushed into the tank or bath with the emulsion and the bedways oil. The metal abrasion debris is collected and removed from the machine manually or automatically. The tank or bath is usually subdivided into several zones, where the shavings and the emulsion are separated. In most cases, perforated screens are used here, so that it is possible to ensure that the pump for conveying the emulsion will not pull in any shavings, which would therefore hinder its delivery power. It is a disadvantage here that the bedways oil interferes with the runoff of emulsion, so that a level gradient develops in the tank or bath when circulation of the emulsion is high, resulting, first of all, in overflow in front of the screen, and, secondly, in an inadequate flow of emulsion to the pump.

A major problem occurs due to surface wetting by the bedways oil film, preventing an exchange of oxygen into the emulsion and specifically causing an increased microbial burden due to bacterial and fungal infestations, in particular during downtimes, which is manifested by a strong odor and discoloration of the emulsion. Especially on weekends or during vacation times, when the emulsion is left to stand for a lengthy period of time and when temperatures are also above 30° C., the possibility of a health risk to the service personnel and the environment cannot be ruled out. Additional problems arise due to hyphae and slime bacteria, which often cause blockage of pipelines and screens.

To prevent this, the machine plus the tank and/or bath must be cleaned at regular intervals and the emulsion must be replaced, but this is very time-consuming and expensive. Cooling lubricants must be used in accordance with professional guidelines, and proof of proper disposal must be documented, a procedure which can be performed only by specialized and approved professional companies.

DE 4211123 C2 discloses a device and a method for removing oil films in which the oil film is removed by adhesion on immersion of a working body.

DE 4404010 C1 discloses an oil skimmer using drums, which are partially submerged to remove the oil film by means of a revolving belt.

Wikipedia, the online encyclopedia, contains an entry describing how the physical state of an interfacial layer that develops between two phases coming in contact, i.e., between solids and liquids, leads to an inhomogeneous film thickness, and this in turn leads to the formation of bubbles when there is a supply of gas/air (soap bubble principle) when there is a combination of gravitation and capillary force, i.e., the driving force, due to adhesion or due to the adhering force.

In addition, it is also explained in Wikipedia that the behavior of liquids changes due to capillarity or the capillary effect on coming in contact with capillaries when they enter into solids, e.g., in narrow tubes, fissures or cavities.

The invention is based on the technical problem of proposing a filter system, which operates better than known methods, devices and systems with regard to both design and efficiency.

According to the invention, this object is achieved with a filter system having the features of claim 1.

This object is achieved in particular by a filter system for removing and/or neutralizing undissolved oils, greases and salts in/on emulsions containing water from tanks and baths in particular, which are used for holding and/or storing emulsions, which are in turn used for cooling and lubricating workpieces and tools during machining, having at least one device as a tangential inlet into an emulsifier filter, an injector for gas enrichment, an adhesion filter with automatic ventilation and an oil collecting vessel having a drain, wherein the filter system as a unit treats mechanically, physically and biologically the emulsion containing insoluble oil and grease droplets, so that then the oil/grease layer is withdrawn from the filter system. The filter system preferably has a capillary filter, which is preferably situated downstream from the adhesion filter.

The filter system preferably has a skimmer for suction removal of the emulsion and the oil/grease film from the emulsion bath/tank, wherein a skimmer suction connection the top or the bottom is preferably provided, optionally using an immersion pump.

Due to this approach according to the invention, a filter system unit is proposed for cleaning machines, baths and/or tanks for the emulsion containing water to remove the oil/grease film from the surface, so that the unemulsified oils/greases are removed from the baths or tanks, and therefore fungal and slime bacterial populations are prevented from developing. In doing so, the unemulsifiable oil is retained due to the adhesion and the capillary reaction when gases/air are added, and this unemulsifiable oil can then be withdrawn from the filter system.

Due to the preferred suction skimmer, which may also include an immersion pump, the emulsion and the oil/grease film, i.e., the emulsion surface in the tank or bath, is/are cleaned, while ensuring that the floating oil/grease film will be withdrawn by suction over the edge of the float and remain at the surface initially because of its lower density. The float is preferably carried on the surface of the emulsion by an enclosed air cushion, which is held in position by a stationary cylinder protruding into the float. A gap is preferably formed between the cylinder and the float by a cross-sectional area, which allows approximately 90% of the emulsion feed to be removed by suction from beneath the emulsion surface. This effect ensures that the emulsion oil/grease film component is <$\frac{1}{20}$th of the amount of liquid removed by suction, so that the retention in the filter system can be monitored.

In another advantageous embodiment of the skimmer, the stationary cylinder is provided with a closed bottom, so that it is designed with a tub shape. Most pans are designed with a very low construction and are installed beneath the machine, so there is only a low emulsion filling level, and therefore a plug caused by air must be prevented from forming during the suction removal. This is achieved through the positioning of the suction pipe, preferably at the center of the tub and of the float. The pipe end is secured fixedly in the tub by means of spacers, so that the emulsion undergoes a 180° turn during suction removal into the pipe. In order for this not to lead to any excessive flow breakaway on the suction pipe, a type of flange is preferably also provided on the intake pipe. This greatly reduces the frictional resistance in deflection of the emulsion stream due to the larger flange edge. This also prevents the development of a plug even at a low skimmer height.

The emulsion loaded with the bedways oil can be sucked by vacuum out of the tank or bath through the skimmer and into the emulsifier filter by means of a pipe connection. The vacuum is created preferably by the fact that the suction and pressure pump located downstream from the emulsifier filter pumps the emulsion out of it. Since the emulsion is degasified in a vacuum, it is possible to ensure, by regulating the gas level, that the excess gas is removed from the emulsifier filter.

If it is possible to connect multiple machines to one filter system, the emulsion loaded with bedways oil can also be pumped by means of an immersion pump out of the bath or tank, through the skimmer by means of a pipe connection, and into a collecting line and then drawn into the emulsifier filter.

If it is possible to connect multiple machines to one filter system, then the cleaned emulsion can flow back into the tank or bath on leaving the filter system in a distribution line and then through the machine-connecting line and by way of an automatic level dosing mechanism by way of an automatic valve, e.g., as a float valve. A cross-flow then develops in the tank or bath, so that the cleaned emulsion causes movement of the emulsion loaded with bedways oil for suction removal via the skimmer.

Control of the gas level preferably ensures that the filling level in the emulsifier filter container is always at the same level, so the pipe cross section of the tangential inflow preferably strikes the surface at the center. The emulsion, loaded with oil/grease, is deflected by the tangential inflow in rotation around the container axis, so that a uniform surface flow is obtained. The lighter oil/grease constituents (for example, bedways oil) can be released from the emulsion stream so that they float to the surface. Filter elements having a lower density than the density of the emulsion preferably float in the surface of the emulsion, so that they also circulate at the surface due to the rotational flow. The rotational flow also causes the filter elements to collide and thereby break up the oil/grease film to form small microdroplets, which are then entrained by the adhesion force of the emulsion.

The embodiment of the filter elements as round bodies is advantageous here because corners and edges (cubes, cuboids, prisms or hollow cylinders) unavoidably result in abrasion and canting of the filter elements. However, since a closed sphere does not have the desired mixing effect in breaking up the film, the sphere has been produced in this embodiment by means of plates. The sphere is advantageously manufactured as a one-piece injection-molded part consisting of plate-like or disk-like elements, which are assembled as two half-shells spaced a distance apart and form an arrangement offset by 90° at the equator, forming points of intersection, where they flow together during injection molding and are thereby shaped into a one-piece element. There are interspaces between the individual plates with walls that border the intermediate spaces and form large inflow surfaces along the interspaces, so that eddy currents develop on the edges of the plates and then lead to the desired comminution effect on the oil/grease film.

In one advantageous embodiment of the level control, a tubular cylinder, which leads downward into the emulsion, starting beneath the container cover, stands vertically at the axial center of the emulsifier filter container, so that the rotational flow is around it and there is no breakaway of flow at the axial center, where an oil/grease film develops. To remove the excess gases from the head space of the emulsifier filter container and ensure that the level surface is uniform, the gases are removed below the cover into the centrally positioned tubular cylinder. A tubular cylinder having a smaller diameter is fastened and sealed in the cover, leading in its length to the surface of the level of the emulsion, so that the excess gases flow into the tubular cylinder when they go below the level of the emulsion. When the excess gases are removed, emulsion flows into the tubular cylinder to replace the gases and this is then preferably detected in the level chamber and is thus used for turning the gas discharge on/off by means of a gas pump. To be sure that a carpet of oil is not flushed in during the level control, the emulsion is preferably supplied from the lower level region of the emulsifier filter.

In order to ensure that the rotational flow of the balls is not disturbed, preferably the space beneath the surface of the level is filled only with emulsion, so that the filter element bed underneath does not come in contact with the floating balls. In addition, this emulsion space serves to calm the flow, so that the rotational flow develops into a vertical flow. The filter elements preferably have the same shape as the floating balls described above, but they are made of a heavier material than the emulsion, so that they lie as a filter bed on the bottom of the screen.

The emulsion flows preferably vertically downward into the emulsifier filter container bottom. In doing so, the emulsion flows around the filter elements, which are preferably made of a plastic, preferably polyamide, that is capable of diffusion. This results in up to 10% loading of the filter due to the porosity property of the material. Liquids, salts and gases are thereby diffused into the filter material and thus ensure a constant osmotic exchange between the emulsion and the filter balls. Anaerobic bacteria therefore accumulate preferentially on the surface of the filter balls and are then constantly supplied with energy due to the osmotic exchange and can therefore better degrade the excess salts. The resulting osmotic pressure can even flow through a bacterial colony because this can result in great pressure differences. This ensures that the interspaces between the filter ball plates are not blocked due to this constant osmotic pressure adjustment.

The emulsion, thereby enriched and prefiltered, flows out of the emulsifier filter bottom and is pumped preferably by a suction pressure pump into the adhesion filter container, where the emulsion is loaded with gas (e.g., air) in the injector, which thus results in a foamy emulsion in the head space and in the gas emulsion distributor space. Then the foamy emulsion is preferably distributed on the filter ball bed arranged beneath it by means of a trickle element, so that the emulsion becomes enriched with gas (oxygen) as it trickles down vertically. The different adhesion properties of the emulsion and the oils/greases cause the phases to separate, so that the gas bubbles are formed from the oils/greases, then coalesce on the polyamide balls and fall due through the sieve plate due to the force of gravity and then onto the surface of the level. Due to the difference in density between the emulsion (approximately 0.98 kg/dm$^3$) and the oils/greases (approximately 0.85 kg/dm$^3$), the lighter oil/grease gas bubbles float as foam on the surface of the level of the emulsion beneath the sieve plate.

The excess gas and oil/grease foam components are preferably separated from the emulsion beneath the sieve plate, so that the enriched emulsion leaves the container at the bottom of the adhesion filter. The excess spent gas preferably flows together with the oil/grease foam into the automatic float discharge mechanism by means of an exhaust air connection. When the gases overflow out of the adhesion filter into the float discharge mechanism, the oil/grease foam, which collects on the surface of the level, is separated due to rupture of the bubbles, so that the excess gases are removed from the automatic float discharge mechanism. In doing so, a carpet of oil is formed and then flows through the oil separation connecting line and into the oil collecting vessel. An under-/overflow is formed due to the difference in density between the emulsion and the oil, so that when the lighter oils/greases flow in, the heavier emulsion flows back out of the oil collecting vessel and into the automatic float discharge mechanism, then leaves it through the level adjuster. The oil/grease enriched with gas is separated in the head space of the oil collecting vessel, so that the excess gas is dissipated through the ventilation. The oil/grease layer, which is dammed up at the lower end, is preferably differentiated from the emulsion by means of a suitable measurement technique (for example, a detector using an alternating electromagnetic field for differentiation of the dielectric properties), so that manual or automatic separation of the oils/greases is possible.

The gas-enriched emulsion preferably leaves the container at the bottom of the adhesion filter and then flows without gas bubbles into the capillary filter from underneath. The same filter elements, which are capable of diffusion, as those already described in the case of the first two filters are also used in the capillary filter container. In this case, the enriched emulsion flows over the filter elements against the force of gravity, thus resulting in capillary retention of the remaining oils/greases between the cavities of the filter plates. The cleaned emulsion then flows out of the head space of the capillary filter container, so that it is returned to the bath or to the container by means of a pipe or hose connection, thereby resulting in a cross-flow in the container, so that the emulsion is again used for cooling and lubricating the workpiece and the tool.

The cleaning of the emulsion from the bath or the container may be interrupted in case of need. Then the emulsion stream is short-circuited in a bypass between the outlet of the capillary filter and the inlet of the emulsifier filter. It is therefore possible to ensure an adjusted supply of gas to the bacteria.

The invention thus relates in particular to a filter system for removing and/or neutralizing undissolved oils, greases and salts in/on emulsions containing water from tanks and baths in particular that are used to hold and store emulsions used for cooling and lubricating workpieces and tools during machining, comprising at least:
  one device as a tangential inlet
  into the emulsifier filter,
  an injector for gas enrichment,
  an adhesion filter having automatic ventilation,
  an oil collecting vessel with a drain, and
  a capillary filter, wherein
the filter system as a unit treats mechanically, physically and biologically the emulsion containing insoluble oil/grease droplets, so that the oil/grease layer is then removed from the filter system.

In a preferred embodiment, the inlet may then be connected as a tangential feed to the emulsifier filter, and the outlet from the capillary filter may then be additionally connected as a return flow to an existing pipeline of a central filter system, for example.

In a preferred embodiment, a skimmer suction connection, optionally using an immersion pump, is provided for suction removal of the emulsion and the oil/grease film from above by means of a skimmer from the emulsion tanks and baths.

In a preferred embodiment, a skimmer suction connection is provided for suction removal of the emulsion and the oil/grease film from underneath the emulsion tank/bath using a skimmer.

In a preferred embodiment, the skimmer is designed so that both the emulsion and the oil/grease film enter the skimmer from the emulsion surface and can be removed by suction from the emulsion bath/tank.

In a preferred embodiment, the floating oil/grease film is sucked over the upper edge of the float and removed through the gap between the cylinder and the float with a suction performance of 1-100%, preferably 10-90% of the skimmer feed, so that the amount of the oil/grease film is less than 1/1, preferably less than 1/20 of the amount of liquid removed by suction.

In a preferred embodiment, the effective skimmer suction height depends on the delivery output of the emulsion and the density of the oil/grease film, and depends on the downward flow in the skimmer, which amounts to >0.1 cm/sec but <20 cm/sec, preferably 1 cm/sec, at an effective skimmer suction height of >1 cm but <100 cm, preferably 10 cm.

In a preferred embodiment, the skimmer has an upper skimmer suction connection, and the skimmer drain is positioned with a deflecting flange preferably at the center of the skimmer.

In a preferred embodiment, the skimmer has a lower skimmer suction connection and the skimmer drain is preferably positioned with a deflecting cap at the center of the skimmer.

In a preferred embodiment, the emulsion loaded with oil/grease film is sucked by a suction pressure pump in vacuo into the emulsifier filter through a pipe-hose connection.

In a preferred embodiment, the excess gases above the gas space and above the mechanical level control and are then removed from the emulsifier filter via the automatic level control through the vacuum in the emulsifier filter and in the emulsion.

In a preferred embodiment, a tubular cylinder is arranged at the axial center as a mechanical level control and then leads vertically downward into the emulsifier filter starting beneath the container cover, so that a rotational flow develops and there is no breakaway flow at the axial center and an oil/grease film cannot build up there.

In a preferred embodiment, filter elements having a density of <1 $kg/dm^3$, floating in the emulsifier filter, are provided, and the excess gases above the gas space in the emulsifier filter are dissipated from above beneath the cover into the centrally arranged tubular cylinder, which is mounted on the cover at a gas-permeable distance, such that a second smaller tubular cylinder, which is fastened in the cover and sealed there, protrudes as far as the surface of the level of the emulsion, so that the excess gases flow from beneath into the smaller tubular cylinder as the gas space expands until the pipe is closed off by the emulsion due to the rise in level of the emulsion.

In a preferred embodiment, the excess gases are removed from the emulsion filter and from the gas space and then an emulsion that is free of any oil/grease film flows from beneath out of the filter elements of >1 $kg/dm^3$ and into the tubular cylinder and is then used for automatic level control for switching.

In a preferred embodiment, the filter elements, preferably spherical, floating on the surface of the emulsion space in the emulsifier filter are induced by the tangential feed to a rotational flow around the mechanical level control, such that the filter elements are moved and the resulting oil/grease film in the rotational flow leads to a filter element collision, so that no oil/grease droplets are formed and then entrained with the emulsion in the downward flow.

In a preferred embodiment, the filter elements are preferably made of a plastic (polyamide) that is capable of diffusion, so that up to 10% of liquids, salts and gases will diffuse into the filter element and will thus ensure a constant osmotic exchange between the emulsion and the filter element, so that anaerobic bacteria preferably accumulate on the surface of the filter element and are then constantly supplied with energy from the osmotic exchange and thereby degrade some of the excess salts.

In a preferred embodiment, the filter element having an adhesion effect is preferably embodied in a spherical shape and comprised of filter plates having a capillary effect, wherein the material is preferably polyamide, so that the interspaces do not become blocked due to the constant osmotic pressure adjustment.

In a preferred embodiment, the emulsion flows out of the emulsifier filter through the sieve bottom and is loaded with a gas/air supply by the suction/pressure pump via the injector and is then pumped into the adhesion filter, wherein a foamy emulsion is formed in the gas emulsion distributor space, being distributed to the filter elements arranged underneath by means of a trickle element, so that the emulsion is enriched with gases.

In a preferred embodiment, the excess gases and oil/grease foam are separated from the emulsion beneath the sieve plate, so that the enriched emulsion leaves the container at the bottom of the adhesion filter.

In a preferred embodiment, the excess gases flow together with the oil/grease foam through the oil/grease/exhaust air connection and into the automatic ventilator, and the gases collect on the surface of the level along with the oil/grease foam, and then the bubbles rupture, so that the excess gases are removed through the automatic ventilator.

In a preferred embodiment, the oil/grease layer flows over the oil separation distribution line into the oil collecting vessel and an under-/overflow is formed due to the difference in density between the emulsion and the oil/grease layer, so that the heavier emulsion flows back out of the oil collecting vessel into the automatic ventilator with the influx of the lighter oil/grease layer, and the heavier emulsion then leaves via the level adjusting vessel.

In a preferred embodiment, the oil/grease layer enriched with gases is separated in the head space of the oil collecting vessel, so that the gas excess is removed through the ventilation.

In a preferred embodiment, the oil/grease layer dammed up at the bottom is differentiated from the emulsion by means of a detector, and manual or automatic discharge of the oil/grease layer can be initiated.

In a preferred embodiment, the gas-enriched emulsion leaves the adhesion filter at the bottom.

In the adhesion filter, the insoluble oils are preferably discharged through a nozzle. The size of the nozzle is preferably designed so that there is no short-circuit flow from the adhesion filter into the double jacket and/or into the pump flow, so that the oil has time to separate from the emulsion and the gas. The nozzle size depends on the circulation rate and the gas input as a function of the diameter of the adhesion filter. For example, a circulation rate of 1400 L/h would require approximately 100-200 L/h gas. The borehole is preferably designed so that it will not become clogged over time, and the level of the emulsion fluctuates only slightly. The oil foam layer can therefore be discharged well.

In a preferred embodiment, the gas-enriched emulsion leaves the adhesion filter at the bottom and flows over the filter elements without gas bubbles, flowing from the bottom into the capillary filter in the direction opposite the force of gravity, so that there can be capillary retention of the remaining oils/greases between the cavities in the filter plates. The cleaned emulsion in the head space of the capillary filter then flows out of the filter system and into the return.

In a preferred embodiment, the cleaning of the emulsion as a tangential feed in the inlet to the emulsifier filter can be interrupted in case of need, and the emulsion flow is short-circuited in the bypass between the outlet of the capillary filter and the inlet of the emulsifier filter to additionally ensure a supply of gas/air to the bacteria.

In a preferred embodiment, the cleaning effect of the emulsion of the oil/grease film in the filter system is monitored and controlled on the basis of the measurement of oxygen and the conductivity value, so that the conductivity probe (LS) and the oxygen probe (SS) can be used as control variables of the filter system and for evaluating the quality of the emulsion.

The invention thus also relates in particular to a filter system for removing and/or neutralizing undissolved oils, greases and salts in/on emulsions containing water, tanks and baths in particular, which are used to hold and store emulsions, which are used for cooling and lubrication of workpieces and tools during machining, having a) at least one device as a tangential feed into b) an emulsifier filter, c) an injector for gas enrichment, d) an adhesion filter having automatic ventilation, e) an oil collecting vessel having a drain and f) a capillary filter, wherein the filter system as a unit treats the emulsion and the insoluble oil/grease droplets mechanically, physically and biologically, so that the oil/grease layer is then separated from the filter system.

Also preferred is a filter system according to the invention, wherein the filter system has a skimmer for suction of the emulsion and the oil/grease film out of the emulsion bath/tank, a skimmer suction connection from the top or from the bottom preferably being provided, optionally using an immersion pump.

Also preferred is a filter system according to the invention, wherein the skimmer is designed so that both the emulsion and the oil/grease film enter the skimmer from the surface of the emulsion and can be sucked out of the emulsion bath/tank.

Also preferred is a filter system according to the invention, wherein the excess gases are removed from the emulsifier filter above the gas space and by means of the mechanical level control and then by means of the automatic level control due to the vacuum in the emulsifier filter and in the emulsion.

Also preferred is a filter system according to the invention, wherein floating filter elements with a density of less than 1 kg/dm$^3$ are provided in the emulsifier filter.

Also preferred is a filter system according to the invention, wherein the filter elements of the emulsifier filter, of the adhesion filter and/or of the capillary filter are made of a plastic that is capable of diffusion. Also preferred is a filter system according to the invention, wherein the filter elements of the emulsifier filter are formed from a plastic that is capable of diffusion.

Also preferred is a filter system according to the invention, wherein up to 10% of liquids, salts and gases diffuse into a filter element and thus ensure a constant osmotic exchange between the emulsion and the filter element so that anaerobic bacteria preferably settle on the surface of the filter element and are then supplied with energy constantly from the osmotic exchange and thereby degrade a portion of the excess salts.

Also preferred is a filter system according to the invention, wherein the filter elements are made of polyamide or consist primarily of polyamide.

Also preferred is a filter system according to the invention, wherein the filter elements are spherical.

Also preferred is a filter system according to the invention, wherein the filter elements are made of filter plates having a capillary action.

The invention also relates to a filter system for removing and/or neutralizing undissolved oils, greases and salts in/on emulsions containing water from tanks and baths in particular, which are used for holding and storing emulsions, which are in turn used for cooling and lubricating workpieces and tools during the machining wherein the filter system has filter elements, wherein the filter elements consist at least predominantly of plastic plates arranged side by side and combine to form a body, wherein a plastic having a water uptake capacity of more than 1% is used as the basic material for the plastic plates.

Also preferred is a filter system according to the invention, wherein the basic material for the plastic plates is polyamide. Also preferred is a filter system according to the invention, wherein the filter element is spherical.

Also preferred is a filter system according to the invention, wherein the filter system is used alternatively or additionally for removing suspended particles, in particular metal abrasion debris. It has been found that the filter system according to the invention surprisingly also leads to a reduction in metal abrasion debris in the emulsion.

The invention also relates to a method for removing and/or neutralizing undissolved oils, greases and salts in/on emulsions containing water from tanks and baths in particular, which are used for holding and storing emulsions, which are in turn used for cooling and lubricating materials and workpieces during machining, wherein a filter system according to the invention is used in the method.

The invention also relates to the use of a filter element for removing and/or neutralizing undissolved oils, greases and salts in/on emulsions containing water from tanks and baths in particular, which are used for holding and storing emulsions, which are in turn used for cooling and lubricating workpieces and tools during machining, wherein the filter element consists at least predominantly of plastic plates arranged side by side and combine to form a body, wherein a plastic having a water uptake capacity of more than 1% is used as the base material for the plastic plates.

It has surprisingly been found that the filter elements described in DE 10 2009 043 110 A1 are suitable not only for cleaning pond systems and aquariums but also for removing and/or neutralizing undissolved oils, greases and salts in/on emulsions containing water from tanks and baths in particular, which are used for holding and storing emulsions, which are in turn used for cooling and lubricating workpieces and tools during machining. These filter elements can preferably also be used in the filter system according to the invention, both in the emulsifier filter and in the adhesion filter as well as in the capillary filter. The description in DE 10 2009 043 110 A1 is thus a part of the present patent application.

A filter element consisting of plastic plates arranged side by side and combined into a body is preferred, wherein a plastic having a water uptake capacity of more than 1% is used as the basic material. The basic material is preferably polyamide. The polyamide is preferably PA 6, in particular PA 6 E.

The basic material is preferably a polyamide with a density of more than 1 kg/dm$^3$. Alternatively, the basic material is a polyamide with a density of less than 1 kg/dm$^3$. The density can advantageously be used to influence whether the filter elements will float on the emulsion or fall through the emulsion.

The filter element is preferably also designed as a one-piece, cambered, i.e., spherical injection-molded part.

The filter element is preferably formed from at least two injection-molded parts which can be releasably connected to one another.

In one embodiment, additives such as glass balls, air, gas or fibers can be mixed with the basic material before injection molding.

An application according to the invention is preferred, wherein the basic material for the plastic plates is polyamide. An application according to the invention, wherein the filter element is spherical, is preferred.

Also preferred is an application according to the invention in a filter system according to the invention.

Also preferred is an application according to the invention, wherein floating bodies, in particular metal abrasion debris, is/are also removed from the emulsion.

The present invention also relates to a method for removing and/or neutralizing undissolved oils, greases and salts in/on emulsions containing water from tanks and baths in particular, which are used for holding and storing emulsions, which are in turn used for cooling and lubricating workpieces and tools during machining, wherein an oil/grease film and parts of the emulsion a) are sucked out of a tank or a bath using a skimmer and b) are removed by filter elements according to the invention. The method is preferably also carried out in a filter system according to the invention.

The present invention also relates to filter elements and filter systems for removing suspended particles, in particular metal abrasion debris as well as the corresponding use and corresponding methods. It has been found that the filter elements described here, in particular in a filter system, surprisingly also lead to a reduction in the metal abrasion debris in the emulsion.

The invention therefore also relates to a filter system for removing metal abrasion debris from emulsions containing water from tanks and baths in particular, which are used for holding and storing emulsions, which are in turn used for cooling and lubricating workpieces and tools during machining, wherein the filter system has filter elements, wherein the filter elements are comprised at least predominantly of plastic plates arranged side by side and combined to form a body, wherein the basic material for the plastic plates is a plastic having a water uptake capacity of more than 1%.

The invention therefore also relates to a filter element for removing metal abrasion debris from emulsions containing water from tanks and baths in particular, which are used for holding and storing emulsions, which are in turn used for cooling and lubricating workpieces and tools during machining wherein the filter element consists at least predominantly of plastic plates arranged side by side and combined to form a body, wherein the basic material for the plastic plates is a plastic having a water uptake capacity of more than 1%.

The invention also relates to the use of a filter element for removing metal abrasion debris from emulsions containing water from tanks and baths in particular, which are used for holding and storing emulsions, which are in turn used for cooling and lubricating workpieces and tools during machining, wherein the filter element consists at least predominantly of plastic plates arranged side by side and combined to form a body, wherein the basic material for the plastic plates is a plastic having a water uptake capacity of more than 1%.

The basic material for the plastic plates is preferably polyamide. The filter element is preferably spherical. The filter element preferably has a diameter of at least 25 mm. The filter element preferably has a diameter of approximately 33 mm.

The filter system is preferably connected to the tank or bath by means of an inlet and a drain.

Use in a filter system according to the invention is preferred.

The invention also relates to a method for removing metal abrasion debris from emulsions containing water from tanks and baths in particular, which are used for holding and storing emulsions, which are in turn used for cooling and lubricating workpieces and tools during machining, wherein an oil/grease film and parts of the emulsion a) are sucked out of a tank or bath by using a skimmer and b) are filtered through filter elements according to the invention. The method is preferably carried out in a filter system according to the invention.

Additional preferred embodiments are derived from the dependent claims.

The invention is explained in greater detail below and described on the basis of the exemplary embodiments depicted in the drawings and an exemplary application.

FIG. 1 shows schematically one embodiment of the filter system according to the invention as a whole.

Figure 1:
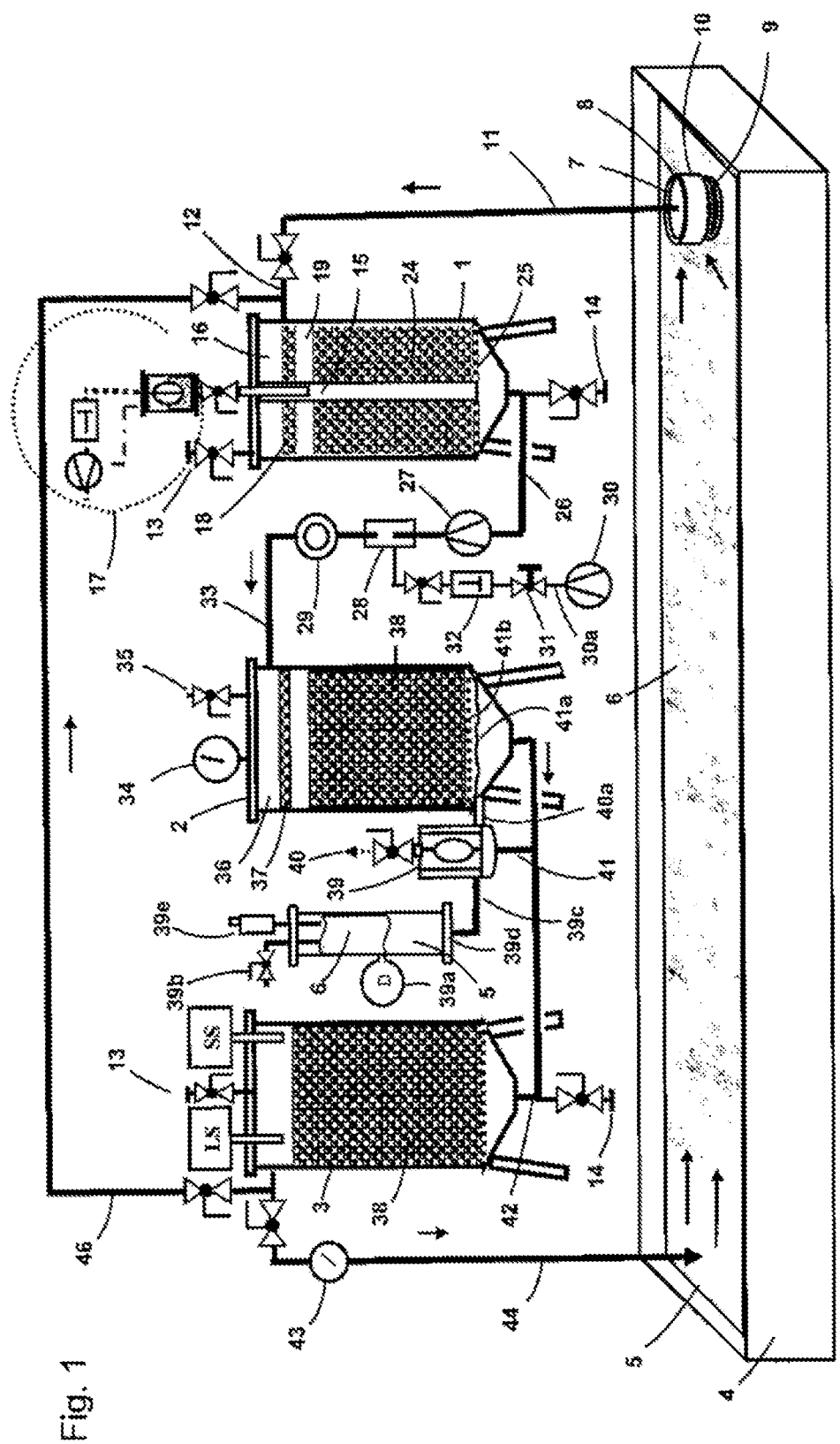
FIG. 1 shows a schematic diagram of the filter system unit according to the invention, embodied as a flow chart.

The system as a whole is preferably reserved as belonging to a metal cutting system and its supply bath or tanks in the emulsion. The inlet line and the drain line to and from the emulsion bath and/or tank belong to the emulsion to be cleaned.

The main components of the filter system include, first, the suction removal of the emulsion 5 in conjunction with the proportional oil/grease film 6 by means of a skimmer 7 as a skimmer suction connection from above 7a or, in the case of multiple machines, with the support of an immersion pump in the skimmer and a downstream collecting line or as a skimmer suction connection from beneath 7b, depending on the type and embodiment of the emulsion bath/tank 4, the emulsifier filter 1, the adhesion filter 2 and the capillary filter 3. The functioning and design of the individual components will be described in succession.

Figure 4:
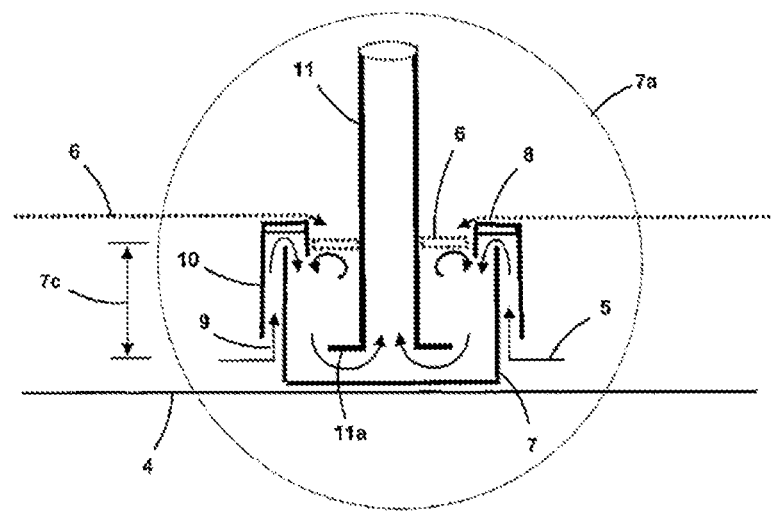
FIG. 4 shows a cross-sectional diagram of the skimmer according to the invention with a connection from above.
Figure 5:
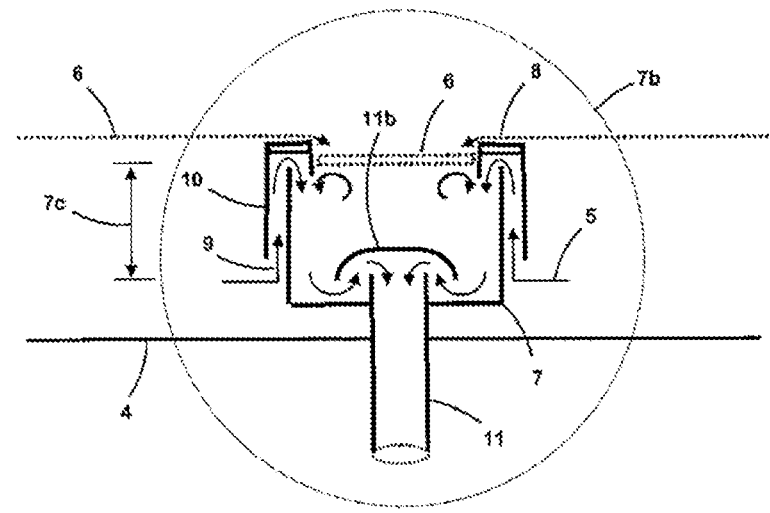
FIG. 5 shows a cross-sectional diagram of the skimmer according to the invention with a connection from beneath.
Figure 6:
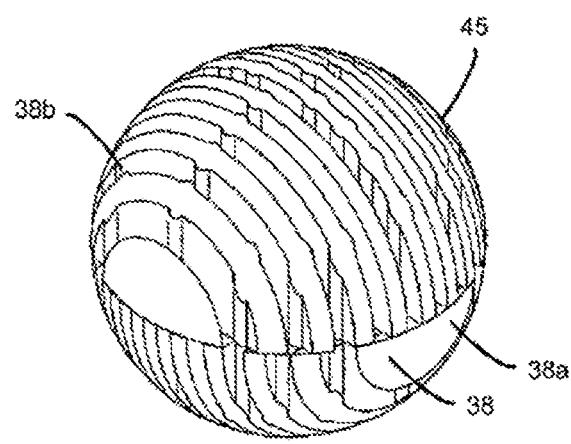
FIG. 6 shows a three-dimensional diagram of the filter element according to the invention as filter balls.
Figure 7:
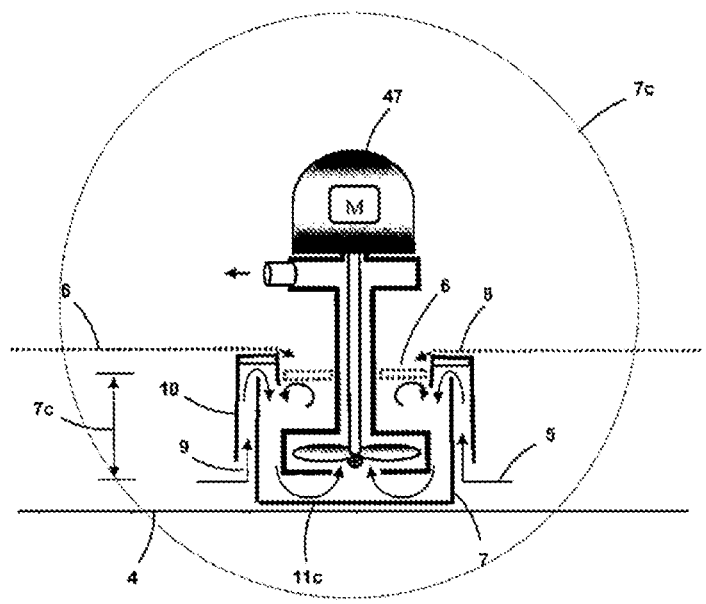
FIG. 7 shows a cross-sectional diagram of the skimmer according to the invention, having an integrated immersion pump.
Figure 8:
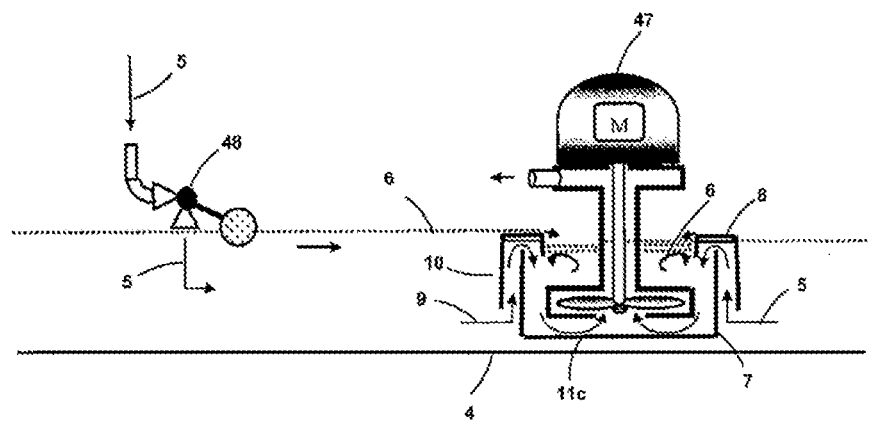
FIG. 8 shows an automatic valve as a float valve.
Figure 9:
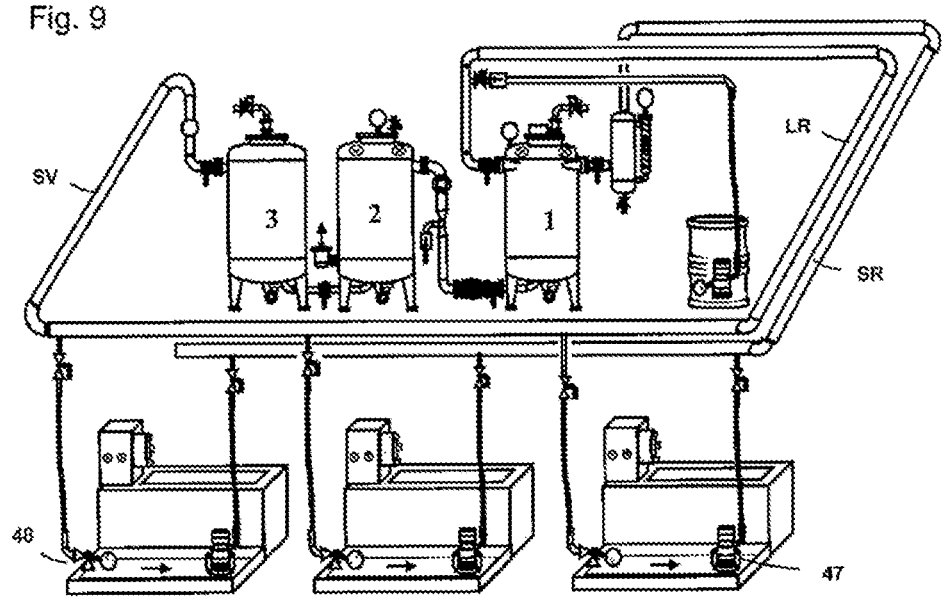
FIG. 9 shows a filter system for processing emulsions from several machining tools.

The emulsion 5 containing water to be cleaned, which is used for cooling and lubricating workpieces and tools during machining of workpieces, is cleaned by using a skimmer 7 and the skimmer drain 11, as described in the more detailed design on the basis of FIG. 4 and FIG. 5 and then initiated by means of a pipeline or a tube line and then fed as a tangential feed 12 into the emulsifier filter 1 for workup.

At the same time, the skimmer 7 removes the emulsion 5 and the oil/grease film 6 from the emulsion surface in the emulsion bath/tank 4 by suction. The floating oil/grease film 6 is sucked over the edge of the float 10. The float 10 is carried by gases 30a as a gas cushion at the surface of the emulsion while it is held in position by a stationary cylinder protruding into the float 10. There is a gap between the cylinder and the float, to which suction is applied in its width for a suction power of 1-100%, preferably 90% of the emulsion feed from beneath the surface of the emulsion as a skimmer feed 9 at the bottom. This effect ensures that the emulsion oil/grease film component 6 is less than 1/1, preferably less than 1/20 of the quantity of liquid removed by suction.

The effective skimmer suction height 7c depends on the delivery performance of the emulsion 5 and on the density of the oil/grease film 6 and the downward flow in the skimmer 7. At a downward flow of >0.1 cm/sec but <20 cm/sec, preferably 1 cm/sec, the effective skimmer suction height 7c is >1 cm and <100 cm, preferably 10 cm.

The stationary cylinder of the skimmer 7 is provided with a closed bottom. In the embodiment in FIG. 4 with suction at the top, to prevent the development of an air plug, the skimmer drain 11 is positioned with a deflecting flange 11a, preferably at the center of the skimmer 7, and is fixedly secured in the tub by means of spacers. In the embodiment in FIG. 5 with downward suction, the skimmer drain 11 is preferably positioned at the center of the skimmer 7 with a deflecting cap 11b to prevent the development of air plugs and is fixedly secured in the tub by means of spacers.

The emulsion 5 loaded with oil/grease film 6 is sucked out of the emulsion bath/tank 4 by means of the skimmer 7 and a pipeline-hose connection into the emulsifier filter 1. A vacuum develops in the emulsifier filter 1 and in the emulsion 5 when the solution is pumped out by means of a suction/pressure pump 27. This is also used at the same time for degassing the emulsion 5 to then remove the excess gas from the emulsifier filter 1 by means of automatic level control 17.

The mechanical level control 15 is a tubular cylinder situated at the axial center, leading vertically downward into the emulsifier filter 1, starting beneath the container cover, so that the rotational flow 20 moves around the axial center, which does not result in any flow breakaway at the axial center and an oil/grease film 6 is built up there.

To ensure the level surface of the filter elements 18 of <1 kg/dm$^3$ floating in the rotational flow 20, the excess gases are removed from the gas space of the emulsifier filter 1 beneath the cover from the top into the centrally arranged tubular cylinder, which is held at a distance and is gas permeable. A second smaller tubular cylinder, which is fastened in the cover and sealed, protrudes to the surface of the level surface of the emulsion, so that the excess gases 30a flow from beneath into the smaller tubular cylinder with the expansion of the gas space 16 until the pipe is closed off by the emulsion 5 due to the rise in level.

If the excess gases 30a are removed from the emulsifier filter 1 and from the gas space 20, then an emulsion 5, which is free of an oil/grease film 6, flows out of the filter elements 24 of >1 kg/dm$^3$ from underneath and into the tubular cylinder, which is then detected in the automatic level control and used for switching.

Figure 2:
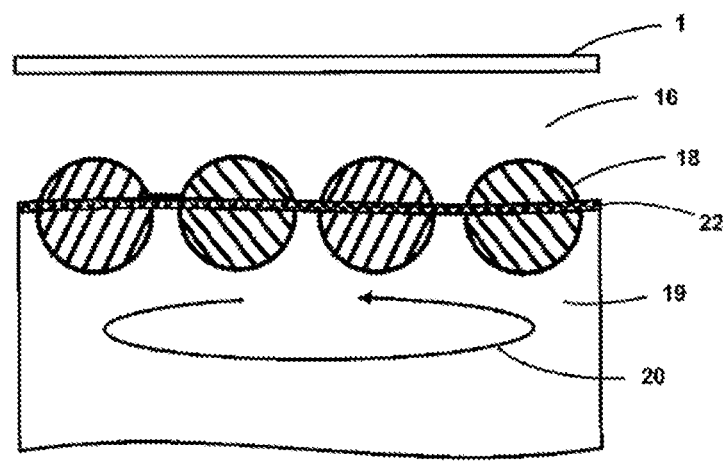
FIG. 2 shows a schematic diagram of the rotational circulation of the filter balls according to the invention in the emulsifier filter.
Figure 3:
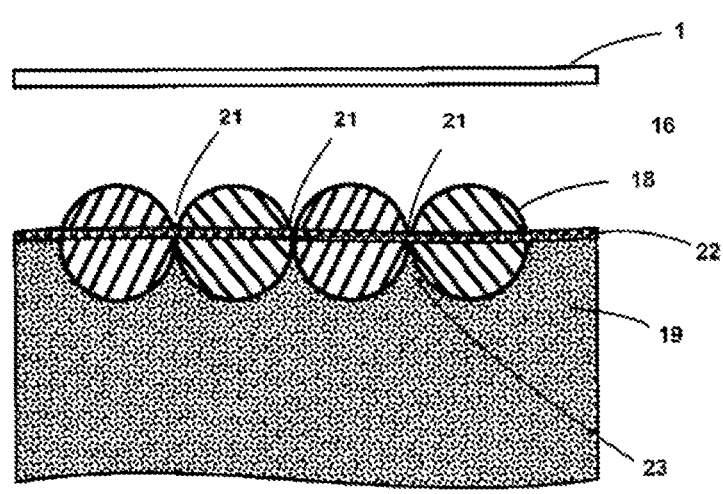
FIG. 3 shows a schematic diagram of the collision of the filter balls according to the invention in the rotational circulation, which serves to create the oil/grease treatment in the emulsifier filter.

Filter elements 18 of <1 kg/dm$^3$, preferably in a spherical shape 45, float on the surface of the emulsion space 19 in the emulsifier filter 1 and are then induced to rotational flow 20 around the mechanical level control 15 due to the tangential feed 12. In doing so, the filter elements 18 of <1 kg/dm$^3$ move with the oil/grease film 6, which is forming as shown in FIG. 2. In rotational flow 20, this leads to a filter element collision 21, which results in the formation of small oil/grease droplets, as shown in FIG. 3, which are then entrained in the downward flow with the emulsion 5.

The emulsion 5 then flows around the filter elements 24 of >1 kg/dm$^3$ made of a preferred plastic (polyamide) that is capable of diffusion, wherein up to 10% liquids, salts and gases 30a diffuse into the filter element 38 and thus ensure a constant osmotic exchange between the emulsion and the filter element 38. Anaerobic bacteria settle preferentially on the surface of the filter element 38 and are constantly supplied with energy from the osmotic exchange and thereby degrade a portion of the excess salts.

The filter element 38 is preferably embodied in spherical shape 45 because the flow around a bed of balls ensures an optimum distribution of resistance. The osmotic pressure, which occurs due to the preferred material (polyamide), can even flow through a bacterial colony because great pressure differences can occur. This ensures that the interspaces between the filter ball plates do not become clogged due to this constant osmotic pressure adjustment.

The emulsion flows through the sieve plate 25 out of the emulsifier filter 1 and is pumped by the suction pressure pump 27 into the adhesion filter 2. The emulsion 5 is preferably supplied with the gas/air supply 30 in the injector 28. In doing so, a foamy emulsion 5 is formed in the gas emulsion distribution space 36. The foamy emulsion 5 is then distributed preferably in spherical form 45 on the underlying filter elements 38 by means of trickle elements 37 and thus the emulsion 5 becomes enriched with gases 30a and oxygen. The phases are separated here due to the difference in the adhesion effect 38a of the emulsion 5 and of the oils/greases so that the gas bubbles are formed from the oils/greases and then coalesce on the polyamide balls drop due to the force of gravity through the sieve plate 25 and then onto the level surface 41a. Due to the difference in density between the emulsion 5 (approximately 0.98 kg/dm$^3$) and the oils/greases (approximately 0.85 kg/dm$^3$), the lighter oil/grease gas bubbles float as an oil/grease form 41b beneath the sieve plate 25 on the level surface 41a of the emulsion 5.

The excess gas 30a and the oil/grease foam 41b are separated from the emulsion 5 beneath the sieve plate 25, so that the enriched emulsion 5 leaves the container at the bottom of the adhesion filter 2. The excess spent gas 30a flows with the oil grease foam 41b into the automatic ventilator 39 by means of the oil/grease/exhaust air connection 40a. In overflow of the gases 30a out of the adhesion filter 2 into the automatic ventilator 39, the oil/grease foam 41*b* collecting on the level surface is separated due to the rupturing of the bubbles so that the excess gases 30*a* are removed from the automatic ventilator 39, while an oil/grease layer 6*a* is formed and then flows over the oil separation connecting line 39*c* into the oil collecting vessel 39*d*. Due to the difference in density between the emulsion 5 and the oil/grease, the result is an under-/overflow so that the heavier emulsion 5 flows back out of the oil collecting vessel 39*d* into the automatic ventilator 39 on influx of the light oils/greases and then they leave the system through the level adjusting device 41. The oil/grease enriched with gases 30*a* is separated in the head space of the oil collecting vessel 39*d*, so that the gas excess is removed through the ventilation 39*e*. The oil/grease layer 6*a*, which is dammed up at the bottom, is measured by means of a suitable measurement technique (e.g., detector 39*a* with an alternating electromagnetic field for differentiation of the dielectric properties). Thus the oils/greases can be differentiated from the emulsion 5, so that either manual or automatic discharge of the oils/greases is made possible.

The gas-enriched emulsion 5 leaves the container at the bottom of the adhesion filter 2 and then flows without gas bubbles from beneath into the capillary filter 3. The same filter elements 38 that are capable of diffusion, like those already described for the first two filters, are used in the container for the capillary filter 3. The enriched emulsion 5 here flows opposite the force of gravity over the filter elements 38, so that there can be capillary retention of the remaining oils/greases between the cavities in the filter plates. The cleaned emulsion 5 then flows in the head space of the capillary filter 3 out of that space as a return flow 44, so that it is retained in the emulsion bath/tank 4 by means of pipe or hose connections. Then a transverse flow develops in the emulsion bath/tank 4, so that the emulsion 5 is again used for cooling and lubricating the workpiece and the tool.

In case of need, the cleaning of the emulsion 5 from the emulsion bath/tank 4 can be interrupted. Then the emulsion flow can be short-circuited between the outlet of the capillary filter 3 and the inlet of the emulsifier filter 1 in the bypass 46. Thus, an adjusted gas/air supply 30 can be ensured for the bacteria by means of the flow regulator 31.

The emulsion 5 flows opposite the force of gravity from the container bottom upward in the head space of the capillary filter 3, while the buffer gases 30*a* from the emulsion 5 are depressurized because the pressure resistance in the capillary filter 3 is lower than that in the adhesion filter 2. This depressurization of the gas can be determined by means of an oxygen sensor SS because its position indicates the saturation limit of the liquid, i.e., of the emulsion 5. For example, fresh water can buffer approximately 9.1 mg/L of oxygen at 20° C. and a standard pressure of 1013 mbar, so this is 100% saturation. At an excess pressure of approximately 100 mbar (1113 mbar), this would then be approximately 10 mg/L, and consequently 110% saturation. This pressure is reduced during the upward flow in the capillary filter 3 because the static liquid column decreases toward the top in the capillary filter 5. Due to the pressure reduction, the buffered gases 30*a* are decompressed and thereby produce small gas bubbles at their surface when then pick up the residual oils and greases not retained in the adhesion filter 2 and then in the automatic ventilator 39 and in the oil collecting vessel 39*d*. A conductivity probe, which is also installed in the head space of the capillary filter, measures the salt content of the emulsion 5. This value is 0 μS/cm in the case of distilled water, because, consequently, no salts are present. This value is approximately 400-700 μS/cm in domestic tapwater. This value can also be much higher in an emulsion because it can also be far greater than 1000 μS/cm due to the evaporation of water from the emulsion and due to the entrainment of dirt during machining. A conductivity probe functions according to the resistance principle, in which an electric voltage is applied between two stainless steel electrodes, for example, so that a few millivolts are measured on the positive electrode by means of liquid resistance of the emulsion as a function of the temperature on the second negative electrode. It has been found here that an almost stable value is displayed in liquids without an oil/grease film 6. If gas bubbles loaded with oil or grease flow over the electrodes, the contact between the liquid and the electrode is temporarily reduced and thus the measured and displayed conductivity value is also reduced due to the adhering oils and greases. This may result in fluctuations of several 100 μS/cm or even several 1000 μS/cm in the measured values. These fluctuations stabilize the lower the oil/grease foam in the emulsion 5. This state of affairs can therefore be used an indicator and as a manipulated variable and control variable for a cleaned emulsion 5 and can therefore be used for controlling the pressure resistance, the emulsion flow and gas enrichment.

FIG. 7 shows an exemplary embodiment in which an immersion pump 47 is used in the skimmer 7 to pump out the oil/grease film. FIG. 8 shows a feed regulator in the form of an automatic float valve 48 in the emulsion for regulating the amount of cleaned recycled material, so that a certain filling level is maintained in the return flow of the filter system to the emulsion bath/tank 4.

As shown in FIG. 9, the filter system may also be used for processing emulsions from a plurality of processing machines. The emulsions from the individual emulsion baths/tanks 4 are preferably supplied by means of immersion pumps 47 to a collecting forward line SV and from there to the emulsifier filter 1. The return flow passes through a collecting return line SR, from which individual lines LR lead via the float valves 48 into the individual emulsion baths/tanks 4 of the respective machine.

FIG. 11 shows a preferred embodiment of the adhesion filter 2 or a filter system for removing metal abrasion debris. The emulsion 5 loaded with bedways oil is enriched with air/gas 30*a* and then flows in the feed into the head space of the adhesion filter 2. By means of a trickle element 37, the mixture is then distributed to the filter elements 38, so that there is friction on the filter elements 38, which thereby develop a positive charge. The negatively charged debris (e.g., metal abrasion debris) in the emulsion 5 adheres to the surface of the polyamide filter balls 38. At the same time, a wedge liquid 49 is formed preferably from the insoluble bedways oils, which then flow downward with the force of gravity as a flowing adhesive liquid. With an increase in the oil/grease layer on the filter elements 38, oil droplets 51 are then formed on the underside of the sieve plate 50 and then drop onto the level surface 41*a* where they form the oil/grease layer. This oil/grease layer floating on the emulsion surface is then driven out of the adhesion filter 2 by means of a gas excess through a nozzle 53, for example, a borehole of approximately 7 mm. The oil/grease foam 41*a* is thereby removed in the oil/grease foam/exhaust air connection 40*a*. The level surface moves up and down in the level of the nozzle 53, for example, by approximately 7-8 mm, because the air excess displaces the emulsion 5 downward, so that the gases can flow out in displacement of the nozzle cross-sectional area and thereby also remove the carpet of oil. Downstream from the nozzle 5, the nozzle jet is depressurized to a larger diameter than the nozzle, so that the gases can then be separated from the insoluble oils.

It has surprisingly been found that metal abrasion debris is deposited as adhering particles 52 on the filter element 38 due to frictional charging. Therefore, such an adhesion filter 2 can also be used for removing metal abrasion debris without necessarily having to perform a separation, in particular a thorough separation of the oil/grease from the emulsion and without any additional filters, for example, an emulsifier filter and/or a capillary filter being connected upstream or downstream. The adhesion filter 2 by itself is instead suitable as a filter system for removing metal abrasion.

Figure 12:
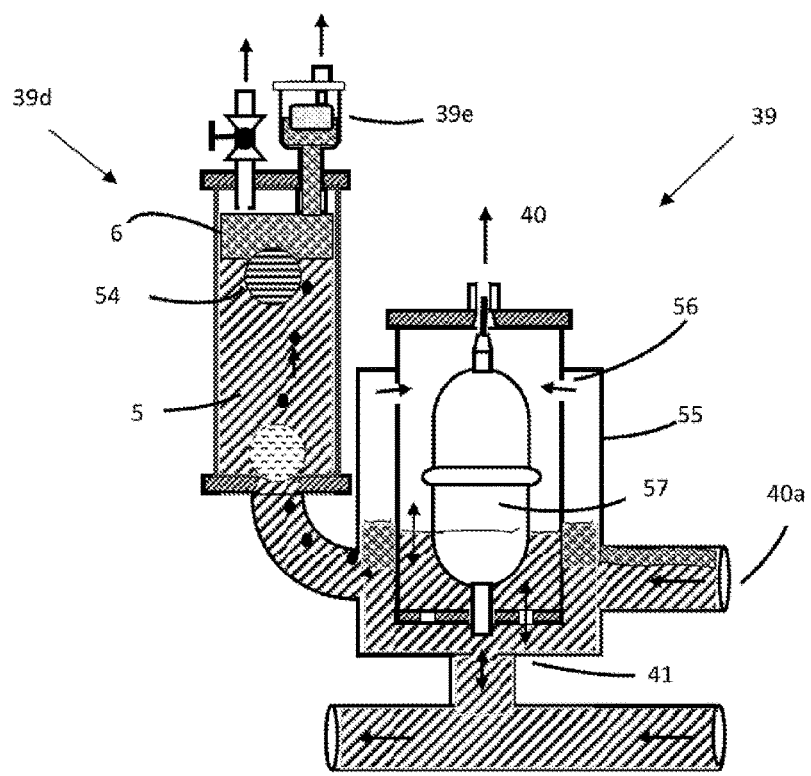
FIG. 12 shows a preferred embodiment of the ventilator and the oil collecting vessel.

FIG. 12 shows a preferred embodiment of the ventilator and of the oil collecting vessel. By means of mechanical float valves (which are also possible, however, with electronic level detection and automatic valves), the gas is separated via the head space of the ventilator 39 when there is a gas excess. The float, which opens and closes the outlet valve, operates here through the buoyancy force, which it maintains due to the rise or fall of the level. The level moves up and down by only a few mm to cm. an oil/grease layer develops at the surface of the level due to the lighter insoluble bedways oil and spreads downward with an increase in the amount of bedways oil and thereby displaces the emulsion. Beneath the level surface of the float, the oil/grease layer, becoming thicker and thicker, flows over the oil drain connecting line and into the oil collecting vessel 39d. Since the oil collecting vessel 39d releases the gas excess in the head space by means of automatic mechanical ventilation, the oil collecting vessel is filled with emulsion at the start of operation. The emulsion is then displaced due to the influx of the lighter bedways oil downward into the double jacket 55 of the automatic ventilator 39 and then flows out of the level adjusting device 41 into the capillary filter 3. Since the gas-oil discharge from the adhesion filter 2 through the nozzle 53 into the exhaust air connection 40a to the automatic ventilator 39 is pulsating, so that the flow to the float 57 is prevented by means of the double jacket 55, so that the excess gases in the double jacket 55 are separated from the bedways oil and then flow through adjusting boreholes 56 into the float head space. This prevents any problematical up-and-down movement of the float 57, so that the level adjustment for the float 57 is completed from beneath by means of a clean emulsion.

The oil collecting vessel 39d with the ventilation 39e has a float ball 54, which prevents a return flow of the oil/grease film 6, at a low level of the emulsion 5 in the oil collecting vessel 39d because it then sinks to the bottom and closes the inlet (broken-line ball in FIG. 12).

EXAMPLE: USE OF A FILTER SYSTEM ACCORDING TO THE INVENTION IN A METAL CUTTING AND LATHING MACHINE

A filter system according to the invention was connected to a metal cutting and lathing machine of the Tatung-Okuma ES-L8 II-M model (made in Taiwan, serial no. ME063). This machine has a high consumption of bed track lubricating oil (bedways oil) of up to approximately 4 L per week. The filter system was designed as shown in the figures.

Design of the Skimmer:

The low filling level (approximately 70-120 mm) of emulsion in the baths beneath the metal cutting machines made it difficult to suck the emulsion out without air by means of the skimmer because the skimmer design consists of a stationary lower inside cylinder and an outside cylinder inverted over the former and floating there. The inside cylinder has an outside diameter of 100 mm, for example, and the floating outside cylinder has an inside diameter that is approximately 1-3 mm larger, so that the floating outside cylinder is guided and positioned on the stationary inside cylinder. The buoyancy of the outside cylinder is then ensured by means of air/gas chambers in the head region. This air buoyancy chamber is converted into the interior of the cylinder by a type of double folding (2×90°). Since this air chamber at the same time provides internal flow deflection, the internal deflecting cylinder is longer than required for buoyancy by the air chamber because of the flow pattern, which is directed downward. In order to obtain only as much buoyancy as needed to keep the float at the surface of the emulsion, the excess air gases are diverted by way of level adjusting boreholes that are somewhat larger than those for pure water because they more easily become clogged due to the adhering deposits of the bedways oils and therefore they retain more gas, which then results in greater buoyancy and an inferior surface suction (water approximately 3-5 mm DN, now 7-8 mm DN). A sufficient amount of emulsion should always be resupplied to adjust a change in the height level of approximately 20-40 mm in the emulsion, which occurs due to evaporation and losses during machining. This can easily result in the filling level moving above the guided upper limit of the outer float cylinder, when topping off the emulsion, and moving out of the guided zone of the internal fixed cylinder. In order for the float not to then drift out of position, preferably four round vertical rods, for example, from the internal radius of 1-2 mm distance from the floating cylinder, prevent it from losing its position.

Metal Shavings:

Floating metal shavings are also pulled in by suction removal from the emulsion surface in the bath by means of a skimmer. Some of these shavings were several centimeters long and were often rolled up into a ring shape, which is associated with machining of the workpiece. Floating of the much larger mass of the shavings by a factor of 1 to 8 in the case of steel, for example, is promoted by the surface adhesion of the lighter bedways oils on the shavings, by the oil film on the emulsion surface, which at the same time results in a higher surface tension of the emulsion surface. These shavings can lead to blockage of the skimmer and the filter system. To prevent blockage of the filter system, a preferred prefilter was connected downstream from the skimmer. During the course of operation of the filter, the surface was freed of the floating bedways oils by filtering out the bedways oils by means of the emulsion filter system. There was thus a great reduction in surface tension and therefore, to a lesser extent, also a reduction in the floating of shavings and suction into the skimmer.

Consumption of Emulsion:

After only a few days of operation with the filter system according to the invention, a reduction in emulsion consumption due to adhesion losses on the shavings was detected. This is probably associated with saturation of the air gases in the emulsion, which occurs due to the treatment in the emulsion filter system, which then leads to a better drip behavior. Due to the additional removal of unemulsifiable bedways oils, the emulsion consumption is reduced by approximately 60% within a few weeks. The oil adhesions in the interior of the machine have then been reduced to such a great extent that the inspection window for the machine operator is free of oil haze.

Flow Pattern in the Filter System:

The velocity of flow in the filter stages depends on the burden due to the insoluble bedways oils, which are lighter in density (890 g/cm³) than the emulsion (<1 approximately 970 g/cm³). If the runoff rate in the emulsifier filter is too low, the oils will float and form a carpet of oil in the rotating inlet flow, becoming thicker and thicker over time and spreading upward and downward. Since the carpet of oil floats on the surface of the emulsion, it protrudes out of the rotating surface and binds the lighter filter balls floating in the emulsion, so that they no longer rotate about their central axis. Due to the vacuum in the filter, small gas bubbles may form in degassing the emulsion and then accumulate in the carpet of oil and are forced as an oil foam into the float switch and therefore into the degassing space. This may result in entrainment of foam into the exhaust air pump, which can lead to problems and damage the pump. An oil foam may be formed in a downward flow of 18 mm/sec. An optimum without formation of an oil foam occurred with a downward flow of 22 mm/sec. Those skilled in the art can readily select a suitable downward flow and adjust it.

Filter Elements:

Filter balls with a diameter of 12 mm were used in the emulsifier filter. This results in an occasionally turbulent mixing of the emulsion in the downward flow, so that the soluble oils in combination with the emulsifiers are re-emulsified, so that the droplet sizes of the dissolved oils are reduced in size and then result in an improved binding of water, which then leads to a greater cooling power. To some extent, the entrained superfine abrasion debris, in particular metal particles, are separated from the bedways oils in this turbulence.

In the bottom drain downstream from the emulsifier filter, the circulating pump conveys the emulsion through the injector, so that atmospheric gas is mixed with the emulsion, which then flows as a gas-saturated emulsion into the head space of the adhesion filter. The emulsion stream was then distributed uniformly among the filter balls having a diameter of 33 mm by means of a nozzle plate with 24 holes. With this size, the balls had a greater air space in their packing density, so that turbulent mixing did not occur. The bedways oil adhered to and between the balls and then formed droplets in a slow gravitational downward flow, and these droplets then fell beneath the sieve plate onto the emulsion surface and were discharged from the adhesion filter via a discharge nozzle bore. The functioning of the separation of the insoluble bedways oils operates in this way, without being bound to the theory, according to the principle of mass concentration between the contact points of the balls. The filter balls are made of polyamide and are capable of diffusion and can absorb approximately 2.5-3.5% moisture. The bedways oils have a higher adhesion force than the emulsion and therefore wet the surface of the filter balls. The wedge of liquid, which is formed symmetrically in the space that is free of force fields, is deformed due to the downward separating force and is thereby forced downward. Finally, a droplet is formed from the wedge liquid and the adhesive liquid flowing after it, then the droplet separates and leaves behind a residual wedge of a smaller size.

Emulsion Buildup in Consideration of the Oil Droplet Size:

Cooling lubricants are used during machining workpieces for cooling (water), lubricating (oil) and for removal of metal abrasion debris. The wear on machines and tools should be reduced and the heat (up to 1000° C.) should also be reduced. Machining at high cutting speeds and with a high heat production requires primarily a cooling effect. The best results can be achieved here by aqueous cooling lubricant emulsions or solutions. Additives are added to cooling lubricant concentrates to form a stable emulsion with surface-active substances (emulsifiers), which permit a distribution of the oil droplets by lowering the interfacial tension between the oil phase and the aqueous phase.

The droplet size depends on the shearing and on the purity of the emulsion. Measurements have shown that when larger droplets of bedways oil are separated, the fineness of the emulsion to be emulsified is improved. This takes place without a reduction in the emulsion concentration. It has been found instead that the concentration to be measured increases because more droplets and finer droplets cause the emulsion to increase. Smaller droplets mean less oil is used for the same surface wetting and thus higher binding of water, which then also results in a better cooling performance.

The emulsions were analyzed to determine their particle size and distribution by using a QUIXEL device for particle size analysis from Sympatec [System-Partikel-Technik], D-38678 Clausthal-Zellerfeld. This device is a wet dispersion system, which is suitable for particle size analysis in all types of suspensions and emulsions in the size range from 0.1 μm to 3.5 mm. The droplet size distribution can be determined by means of laser diffraction. FIGS. 10a-10e show the results.

Figure 10A:
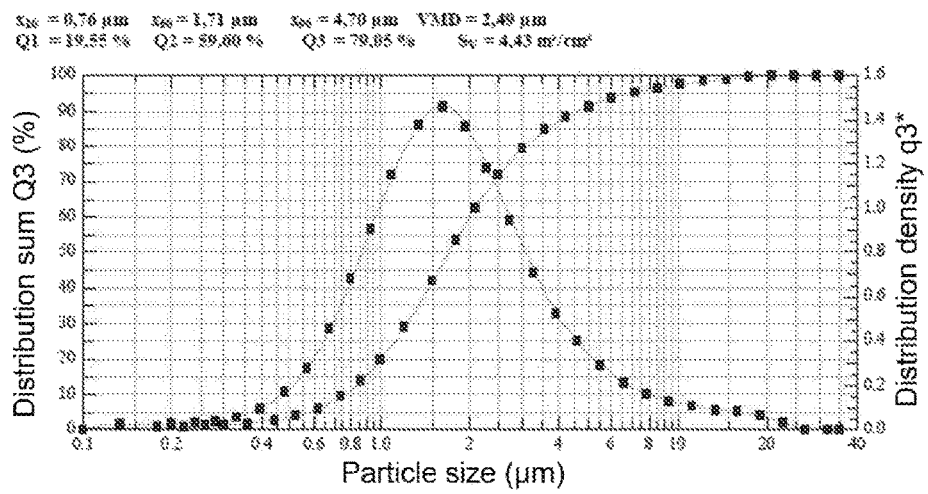
FIGS. 10a-10e show the particle size distribution of the oil content in the emulsion during the use of a filter system according to the invention in a metal cutting and lathing machine.

When starting operation of the filter system, the droplets, i.e., particles, are determined and reported in three different sizes and in the percentage ratio. As shown in FIG. 10a, $Q1=19.55\%$ of the droplets (particles)<0.76 μm, $Q2=59.60\%<1.71$ μm and $Q3=79.05\%<4.70$ μm. The average particle size VMD was 2.49 μm. The surface wetting was 4.43 m²/cm³.

Using an electron microscope, the size and distribution of the droplets were investigated. This revealed that some larger droplets had inclusions consisting of very small metallic abrasion debris enclosed in insoluble bedways oils. The fact that no larger agglomerates of metal abrasion debris particles were formed can be explained by the charge carried by these particles, making van der Waals forces ineffective.

Figure 10B:
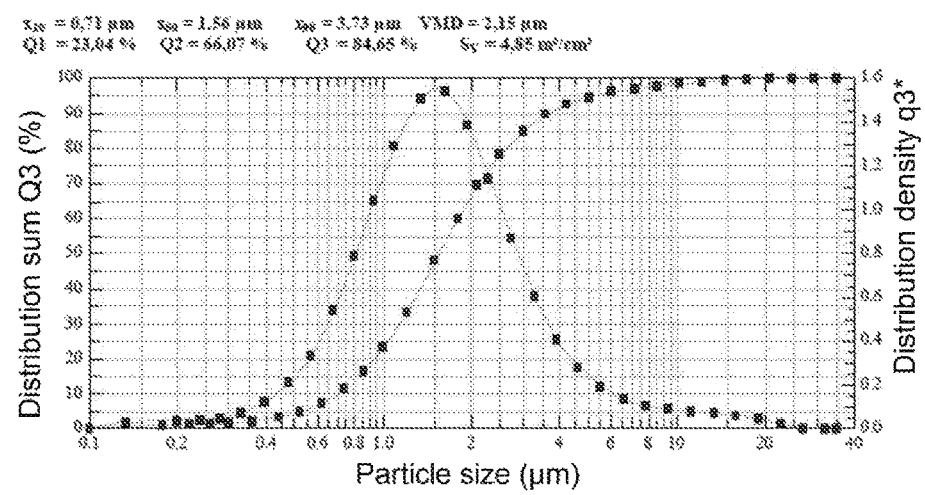

After one week of filter operation, the droplets had become smaller with regard to particle size and the surface coverage had increased by 9.5%, as shown in FIG. 10b.

Figure 10C:
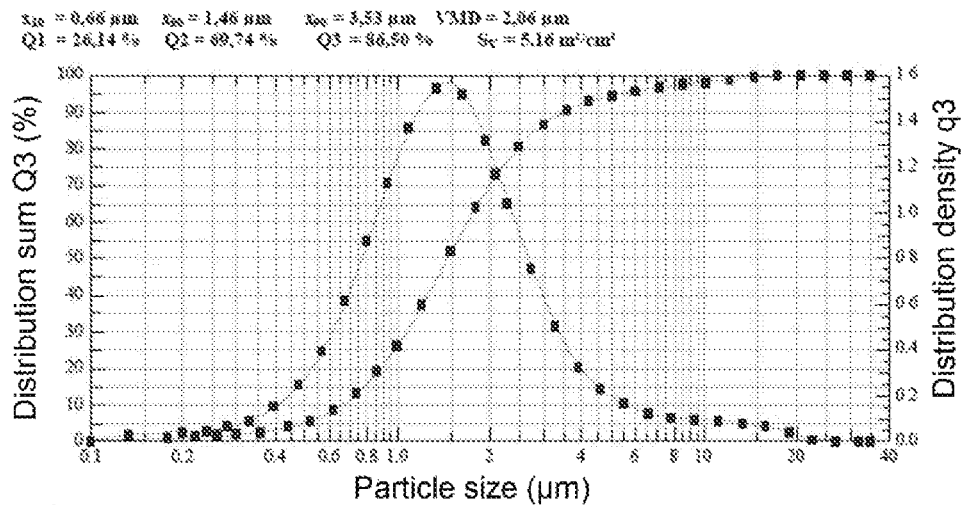

After three weeks of filter operation, the droplets had become even smaller with regard to particle size, and the surface coverage had increased again by 6.4%, as shown in FIG. 10c.

Figure 10D:
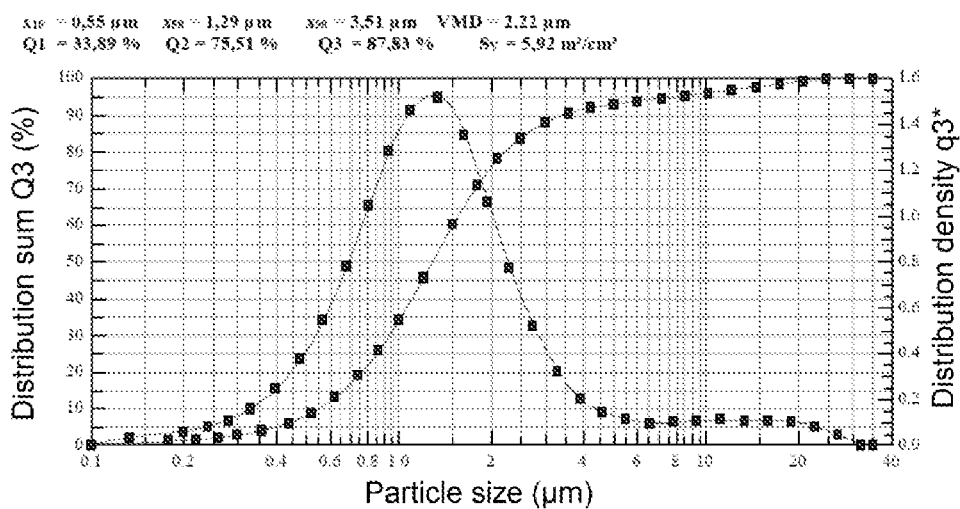

After a total of six weeks of filter operation, as shown in FIG. 10d, the droplets had become even smaller with regard to particle size and the surface coverage had risen to 5.92 m²/cm³, which means a further increase by 14.7%.

Figure 10E:
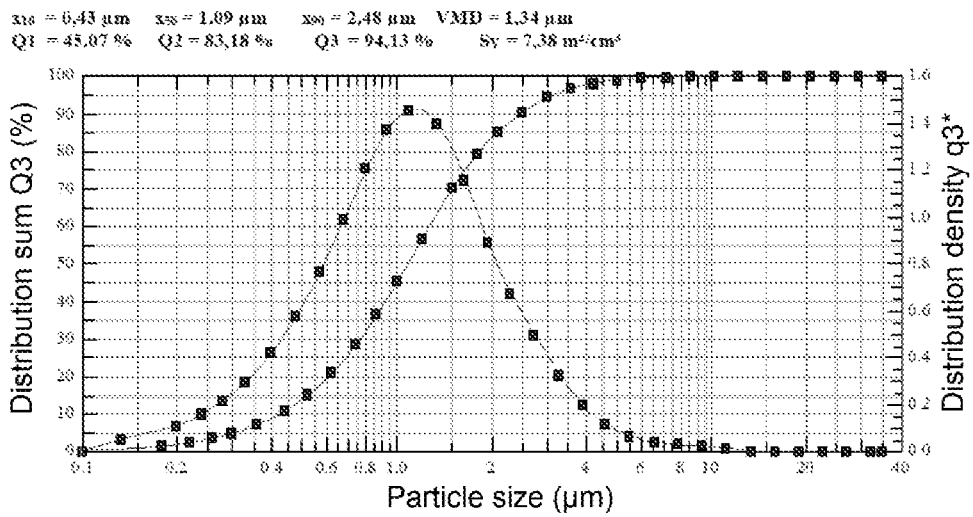
Figure 11:
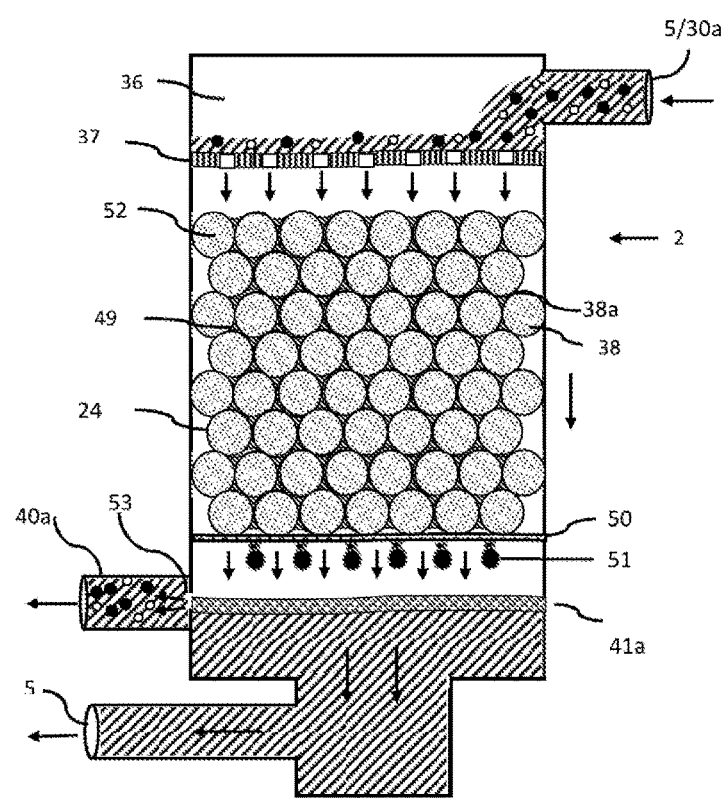
FIG. 11 shows a preferred embodiment of the adhesion filter or a filter system for removing metal abrasion debris.

After several months of operation of the emulsion filter system, approximately 50% to 60% of the bedways oils added had been removed by the filter system. The purity and the droplet size, measured as particle size, were again improved, as shown by FIG. 10e. Due to the removal of the large droplets, the quantity of metal abrasion debris had decreased, on the one hand, while the emulsion fineness had increased, on the other hand. The oil content measured by means of refractometry did not show a negative influence. A further increase to 7.38 m²/cm³ has shown that the quality of the emulsion had increased and its cooling property was greatly improved. By comparing the quality at the start of filter operation with that at the last measurement, it is found that the surface coverage has increased by 67%.

Metal Abrasion Debris:

Electron micrographs showed metal abrasion debris, enclosed in bedways oil. The metal abrasion debris has therefore undergone a density adjustment, so that the combination with the bedways oil has a density similar to that of the dissolved oil emulsion and therefore the metal abrasion debris particles remain in suspension. This can lead to problems because the cooling water pump sucks in the metal abrasion debris along with the emulsion and then sprays it onto the workpiece and the tool, so that some of the abrasion particles become trapped in the blade clearance and therefore can result in a shortened lifetime of the tool blade.

In investigating the polyamide filter balls, deposits of metal abrasion debris were found in the course of filtration in particular in the adhesion filter, increasing progressively with longer operating times. Without being restricted by a theory, these deposits are probably caused by electrostatic forces, since the polyamide balls become charged by the flow due to frictional forces, so that all the negatively charged abrasion debris will adhere to the balls like metal bonding.

Due to the use of the filter system according to the invention, the proportion of metal abrasion debris has decreased in particular also due to deposition on the filter elements and removal of the large droplets, so that the problems associated with metal abrasion debris are definitely minimized. Eliminating the metal abrasion debris increases in particular the cutting capability and thus also results in a longer cutting capability. In the present experiment, the machine operator found an improvement by approximately 20-30%.

Nitrite Burden in the Emulsion:

The emulsion is loaded with the resulting nitrite due to the thermal stress on the bedways oils on the surface of the metal shavings at temperatures up to 1000° C. The usual weekly increase in the nitrite content of approximately 0.5 mg/liter was reduced by removing the bedways oils. This is associated with the elimination of the bedways oils, which then no longer burn up on the hot shavings.

Bacterial Influence as a Function of pH:

Studies have shown that there were no negative effects on the biological bacterial culture due to the filter system in the investigation phase. It was found that the stable pH was between 9 and 10 and the high conductivity value of >5000 µS/cm has a limiting effect on a bacterial population. The concentration of bacteria in the cooling lubricant emulsion was approximately 2300 CFU/mL on the average over the sampling time, with fluctuations between 576 and 4933 CFU/mL. These concentrations can basically be assessed as low. The differences in concentrations are within the normal range of fluctuation.

Since the removal of bedways oil was accomplished by means of intake air in the filter system, a preferred sterile air filter was additionally installed upstream from the air compressor. Since most bacteria in the ambient air are in the size range of >0.3 µm, a sterile air filter with a pore size of <0.2 µm ensures that the microorganisms are retained from the air. However, such a filter is not absolutely necessary due to the reduction in the quantity of bacteria.

After starting operation of the filter system, an unpleasant odor could no longer be perceived after two days, which can be attributed in part to the degassing in the first filter and also to the oxygen saturation in the adhesion filter.

In summary, the following advantages can be achieved by using the filter system according to the invention:

The cooling lubricant (KSS) has a lighter color and a better purity accordingly.
There are no foul odors.
The cooling lubricant has a more fluid consistency.
The amount of metal abrasion debris is greatly reduced.
The adhering oil-metal abrasion deposits are greatly reduced.
Less oil must be added to the cooling lubricant due to the smaller oil droplets.
A definite decline in the amount of insoluble oils can be achieved.
The salt content can be greatly reduced, which in turn leads to a reduction in foaming and in the abrasive particles that are precipitated.
Foaming is reduced or even prevented.
Only minor residues of cooling lubricant are deposited on the workpiece.
The emulsion runs off the workpiece better in blow down.
The pH remains stable or even increases slightly, so that bacterial growth is minimized.
The cooling lubricant has a higher oxygen content, so that the cooling performance is improved.
The formation of nitrite is reduced or prevented.
There is little or no negative effect on the quality of the cooling lubricant at the lifetime of the machine.
On the whole, the health burden due to operation of the machine is reduced in particular due to a lower burden of bacteria, fungi and nitrite.

LIST OF REFERENCE NUMERALS 1 emulsifier filter
2 adhesion filter
3 capillary filter
4 emulsion bath/tank
5 emulsion
6 oil/grease film
6a oil/grease layer
7 skimmer
7a skimmer suction connection from above
7b skimmer suction connection from beneath
7c effective skimmer suction height
8 skimmer inlet above
9 skimmer inlet beneath
10 float
11 skimmer drain
11a deflecting flange
11b deflecting cap
11c intake
12 tangential feed
13 rinse valve
14 rinsing liquid inlet
15 mechanical level control
16 gas space
17 automatic level control
18 filter elements <1 kg/dm$^3$
19 emulsion space
20 rotational flow
21 filter element collision
22 oil/grease droplets
23 emulsion formation
24 filter elements >1 kg/dm$^3$
25 sieve plate
26 drain emulsifier filter
27 suction pressure pump
28 injector
29 inspection window
30 gas/air supply
30a gases
31 flow regulator
32 return flow preventer
33 inlet adhesion filter
34 pressure monitoring
35 ventilation 36 gas emulsion distributor space
37 trickle element
38 filter elements
38a adhesion effect
38b capillary effect
39 automatic ventilator
39a detector (oil/water/emulsion)
39b drain (oil water/emulsion)
39c oil separation connecting line
39d oil collecting vessel
39e ventilation
40 exhaust air
40a oil/grease foam/exhaust air connection
41 level adjustment
41a level surface (oil/water/emulsion)
41b oil/grease foam
42 inlet capillary filter
43 temperature monitoring
44 return flow
45 spherical shape
46 bypass
47 immersion pump
48 automatic float valve
49 wedge liquid
50 sieve plate
51 oil droplets
52 particle adhesion
53 nozzle
54 floating ball
55 double jacket
56 adjusting borehole
57 float
LS conductivity probe (measured value in pS/cm)
SS oxygen probe (measured value in % saturation of the emulsion as a function of temperature)
SV collecting forward line
SR collecting return line

The invention claimed is:

1. A filter system for removing and/or neutralizing undissolved oils, greases and salts in/on aqueous emulsions from tanks and baths, which are used for holding and storing emulsions, which are in turn used for cooling and lubricating workpieces and tools during machining, the filter system comprising:
a tangential feed into an emulsifier filter;
an injector for gas enrichment;
an adhesion filter having an automatic ventilator; and
an oil collecting vessel having a drain,
wherein the filter system is configured to treat the emulsion containing insoluble oil/grease droplets mechanically, physically and biologically, such that an oil/grease layer is then discharged from the filter system.

2. The filter system according to claim 1, wherein the filter system has a skimmer for suction removal of the emulsion and the oil/grease layer from an emulsion bath/tank, wherein a skimmer suction connection is provided, optionally using an immersion pump.

3. The filter system according to claim 1, wherein the filter system has a capillary filter.

4. The filter system according to claim 2, wherein the skimmer is designed so that both the emulsion and the oil/grease layer enter the skimmer from an emulsion surface and can be sucked out of the emulsion bath/tank.

5. The filter system according to claim 1, wherein the emulsifier filter includes floating filter elements with a density of less than 1 kg/dm$^3$.

6. The filter system according to claim 1, wherein at least one filter selected from a group consisting of the emulsifier filter, the adhesion filter and a capillary filter is formed from a plastic capable of diffusion.

7. The filter system according to claim 1, comprising filter elements made of polyamide or containing mainly polyamide.

8. The filter system according to claim 1, comprising spherical filter elements.

9. The filter system according to claim 1, comprising filter elements made of filter plates having a capillary action.

10. The filter system according to claim 1, further comprising filter elements including a plurality of plastic plates arranged side by side and combined to form a body, the plastic plates constructed of a plastic having a water uptake capacity of more than 1%.

11. The filter system according to claim 10, wherein the plastic plates are constructed of polyamide.

12. The filter system according to claim 10, wherein the body is spherical.

13. The filter system according to claim 12, wherein the filter element has a diameter of at least 25 mm.

14. The filter system according to claim 10, wherein the filter system is connected to the tank or the bath via an inlet and a drain.

15. The filter system according to claim 1, wherein the emulsifier filter includes floating filter elements comprising anaerobic bacteria settled on surfaces of the floating filter elements.

16. The filter system according to claim 15, further comprising a capillary filter and a bypass between an outlet of the capillary filter and an inlet of the emulsifier filter, wherein the bypass supplies gas/air to the anaerobic bacteria.

17. A method for removing and/or neutralizing undissolved oils, greases and salts in/on aqueous emulsions from tanks and baths in particular, which are used for holding and storing emulsions, which are in turn used for cooling and lubricating workpieces and tools during machining, the method comprising:
removing an oil/grease film and parts of the emulsion from a tank or a bath using a skimmer; and
filtering the oil/grease film and parts of the emulsion through at least one element including a plurality of plastic plates, the plurality of plastic plates arranged side by side and combined to form a body, the plastic plates constructed of a plastic having a water uptake capacity of more than 1%.

18. The method according to claim 17, wherein the method is carried out in a filter system comprising:
a tangential feed into an emulsifier filter;
an injector for gas enrichment;
an adhesion filter having an automatic ventilator; and
an oil collecting vessel having a drain,
wherein the filter system is operative to treat the emulsion containing insoluble oil/grease droplets mechanically, physically and biologically, such that an oil/grease layer is then discharged from the filter system.

19. A method for removing metal abrasion debris from aqueous emulsions from tanks and baths, which are used for holding and storing emulsions, which are in turn used for cooling and lubricating workpieces and tools during machining, the method comprising:
removing an oil/grease film and parts of the emulsion from a tank or a bath using a skimmer; and
filtering the oil/grease film and parts of the emulsion through at least one element including a plurality of plastic plates, the plurality of plastic plates arranged side by side and combined to form a body, the plastic plates constructed of a plastic having a water uptake capacity of more than 1%.

* * * * *